UNITED STATES PATENT OFFICE.

MARY BEER, OF PHILADELPHIA, PENNSYLVANIA.

COMPOSITION FOR CLEANING AND DISINFECTING FEATHERS.

SPECIFICATION forming part of Letters Patent No. 243,754, dated July 5, 1881.

Application filed March 15, 1881. (No specimens.)

*To all whom it may concern:*

Be it known that I, MARY BEER, a citizen of the United States, residing at Philadelphia, in the county of Philadelphia and State of Pennsylvania, have invented a new and useful Composition of Matter for Cleaning and Disinfecting Feathers, of which the following is a specification.

My composition consists of the following ingredients, combined in the proportions stated, viz: water, ten gallons; chloride of lime, one pound; pulverized orris-root, six ounces; alcohol, one pint. These ingredients should be thoroughly mixed before using. This composition is placed in a suitable boiler and heated, and the fumes and vapors arising therefrom are passed through the feathers to be treated, thereby eliminating thoroughly and speedily all germs of contagious disease and all unpleasant odors.

What I claim, and desire to secure by Letters Patent of the United States, is—

The herein-described composition of matter to be used in cleaning and disinfecting feathers, consisting of water, chloride of lime, orris-root, and alcohol, in the proportions specified.

MARY BEER.

Witnesses:
CRESCENTIA BEER,
W. W. DOUGHERTY.